United States Patent [19]

Askwith et al.

[11] Patent Number: 4,811,920
[45] Date of Patent: Mar. 14, 1989

[54] AERIAL DEVICE

[75] Inventors: Andrew P. Askwith, St. Albans; John S. Lingard, Winchester, both of England

[73] Assignee: GQ Defence Equipment Limited, Godalming, England

[21] Appl. No.: 150,436

[22] Filed: Feb. 1, 1988

Related U.S. Application Data

[63] Continuation of Ser. No. 824,555, Jan. 23, 1986, abandoned.

[30] Foreign Application Priority Data

Jan. 24, 1985 [GB] United Kingdom ............... 850752

[51] Int. Cl.⁴ ............................................. B64D 17/02
[52] U.S. Cl. ..................................... 244/145; 244/146; 244/902
[58] Field of Search ................ 244/142, 145, 146, 902

[56] References Cited

U.S. PATENT DOCUMENTS

| | | | |
|---|---|---|---|
| 3,154,268 | 10/1964 | Struble, Jr. | 244/142 |
| 3,469,805 | 9/1969 | Craig et al. | 244/148 |
| 3,558,087 | 1/1971 | Barish | 244/142 |
| 3,749,337 | 7/1973 | Jalbert | 244/145 |
| 3,893,641 | 7/1975 | Sutton | 244/142 |
| 3,944,169 | 3/1976 | Bede | 244/142 |
| 4,424,945 | 1/1984 | Dell . | |

*Primary Examiner*—Galen Barefoot
*Attorney, Agent, or Firm*—Birch, Stewart, Kolasch & Birch

[57] ABSTRACT

A load carrying aerial device having an inflatable component which is inflatable from a collapsed configuration to an inflated aerofoil configuration and which is maintained inflated in flight by air introduced into the component through an air intake as a result of relative motion of the component and the surrounding air. The leading edge of the component throughout its length or substantially throughout its length is closed or maintained closed in flight and is inclined at such an angle to the longitudinal axis of the component that the internal stagnation pressure of the air within the component at the leading edge produced by the relative motion of the component and the air always exceeds the external static pressure of the air on the leading edge, thereby ensuring maintenance of the profile of the leading edge in flight.

11 Claims, 5 Drawing Sheets

AERIAL DEVICE

This application is a continuation of application Ser. No. 824,555 filed on Jan. 23, 1986, now abandoned.

BACKGROUND OF THE INVENTION

The present invention relates to an aerial device which includes an inflatable component which is inflatable from a collapsed configuration to an inflated aerofoil configuration and which is maintained inflated in flight by air introduced into the component through air intake means as a result of relative motion of the component and the surrounding air and is particularly although not exclusively concerned with an aerial device for use in controlling the aerial descent of a load.

It is now a common requirement to provide parachutes which are highly maneuverable during descent. A form of highly maneuverable parachute now widely used and commonly known as a ram-air or aerofoil parachute has an inflatable canopy which when inflated during descent takes up a rectangular shape in planform and an aerofoil shape in section. Such aerofoil parachutes give to the parachutist a high degree of glide control, enabling him to follow any one of a variety of descent flight paths with precision.

In aerofoil parachutes commonly used, the canopy is formed by fabric upper and lower surfaces connected together by a plurality of fabric ribs which are spaced apart across the canopy to form with the surfaces side-by-side cells. The cells thus formed are open at the leading edge of the canopy and extend rearwardly from the open leading edge to the trailing edge of the canopy which is closed. The open leading edge although providing for efficient inflation of the canopy necessarily limits the performance of the canopy as an aerofoil.

Where an attempt is made to close the leading edge of the canopy and to provide for inflation by an air intake elsewhere on the canopy it is found that the canopy at the closed leading edge is not well supported by inflation air introduced into the canopy and tends to collapse.

SUMMARY OF THE INVENTION

An object of the present invention is to provide an inflatable aerofoil parachute which does not suffer from the above-mentioned drawback.

According to the present invention, there is provided a load carrying aerial device comprising an inflatable component which is inflatable from a collapsed configuration to an inflated aerofoil configuration and which is maintained inflated in flight by air introduced into the component through air intake means as a result of relative motion of the component and the surrounding air, characterised by the fact that the leading edge of the component throughout its length or substantially throughout its length is closed or maintained closed in flight and is inclined at such an angle to the longitudinal axis of the component that the internal stagnation pressure of the air within the component at the leading edge produced by the relative motion of the component and the air always exceeds the external static pressure of the air on the leading edge, thereby ensuring maintenance of the profile of the leading edge in flight.

In embodiments of the invention hereinafter to be described the leading edge extends away from the longitudinal axis of the component on each side thereof outwardly and rearwardly to provide in planform a swept back configuration symmetrical with respect to the longitudinal axis of the component.

In a first embodiment of the invention, the air intake means comprises an air intake spaced from the leading edge. Preferably, the air intake is located on the underside of the component symmetrically with respect to the longitudinal axis of the component and is constructed as a fabric air scoop.

In a second embodiment of the invention, the air intake means comprises an air intake arranged in the leading edge of the component in the region of and symmetrical with respect to the longitudinal axis, and the leading edge is formed by port and starboard leading edge portions which are closed and which extend away from the air intake on each side thereof. Preferably, the air intake is arranged to remain open not only during inflation of the component but also during descent for the maintenance of inflation of the component in flight.

The inflatable component is preferably formed by fabric upper and lower surfaces joined together by a plurality of fabric ribs which are spaced apart to form with the surfaces side-by-side cells extending rearwardly from the leading edge of the component. The ribs are preferably also so constructed as to allow communication of inflation air between adjacent cells.

In a third embodiment of the invention, where the inflatable component is formed by fabric upper and lower surfaces joined together by spaced fabric ribs as hereinbefore set forth, the air intake means additionally comprises a plurality of air intakes which have closable openings in the surface material of the component which open for inflation of the component and automatically close when the internal pressure of the air within the component exceeds the external pressure of the air at the opening.

In one form of the aforesaid third embodiment of the invention, each of the closable openings is formed by opposing overlapping portions of surface material which move apart to form a slit opening to permit the passage of inflation air when the external pressure exceeds the internal pressure and which are caused to move together to seal the opening when the internal pressure exceeds the external pressure. The slit openings are preferably provided in the leading edge of the component and extend in planes parallel to the ribs.

In another form of the aforesaid third embodiment of the invention, each of the closable openings is formed by a first portion of surface material overlapping an aperture in a second portion of surface material, with the first portion of surface material being secured to the second portion of surface material by an air pervious material, and the arrangement is made such that when the external pressure exceeds the internal pressure the first portion of surface material moves away from the second portion of surface material to permit the passage of inflation air into the component through the air pervious material and closes upon the second portion of surface material to close the aperture therein when the internal pressure exceeds the external pressure. Preferably, the aperture in the second portion of surface material is of rectangular shape and the first portion is of corresponding shape with the air pervious material extending round the peripheries of the aperture and the first portion. The closable openings thus formed are located either in the leading edge of the component or on the underside of the component.

BRIEF DESCRIPTION OF THE DRAWINGS

Embodiments of the invention will now be described by way of example with reference to the accompanying drawings in which.

DETAILED DESCRIPTION OF THE PREFERRED EMBODIMENTS

Figure 1:
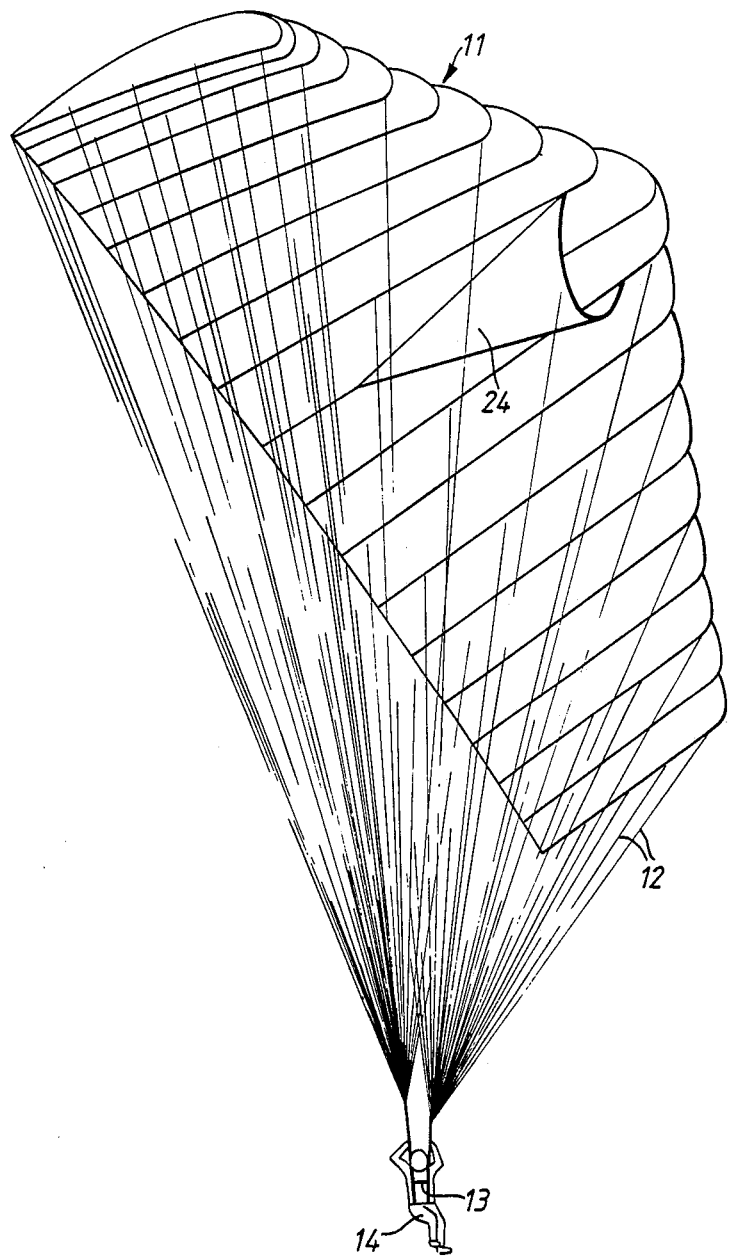
FIG. 1 is a schematic perspective view from below of an aerofoil parachute according to the first embodiment of the invention.

Referring first to FIG. 1, the aerofoil parachute shown comprises an inflatable aerofoil canopy 11 connected by suspension lines 12 to a support harness 13 for supporting a parachutist 14.

Figure 2:
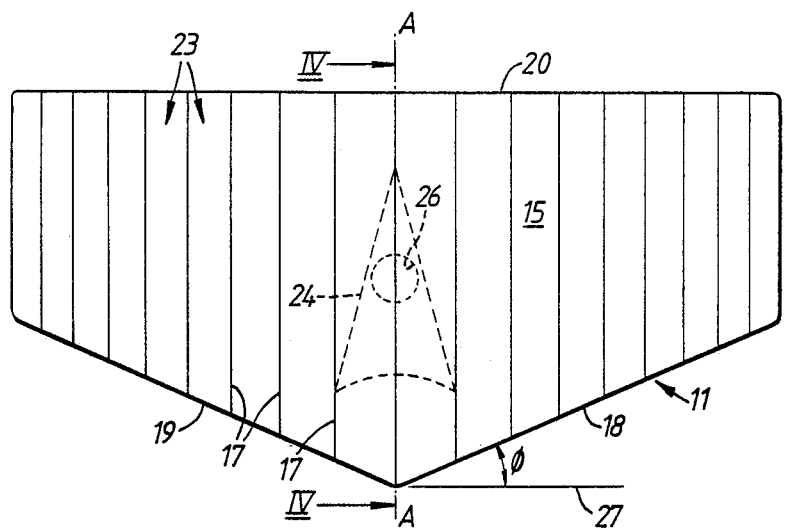
FIG. 2 is a schematic plan view of the canopy of the parachute shown in FIG. 1 viewed from above.
Figure 3:
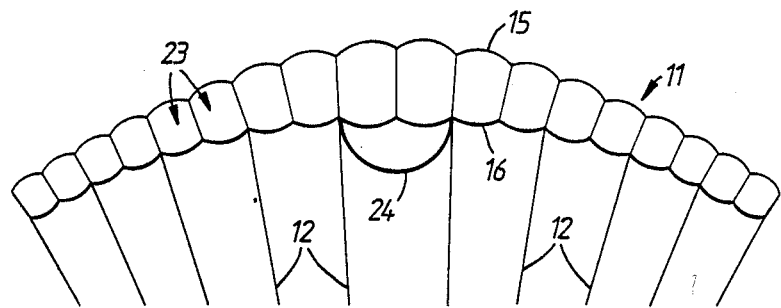
FIG. 3 is a schematic front view of the canopy shown in FIG. 2.
Figure 4:
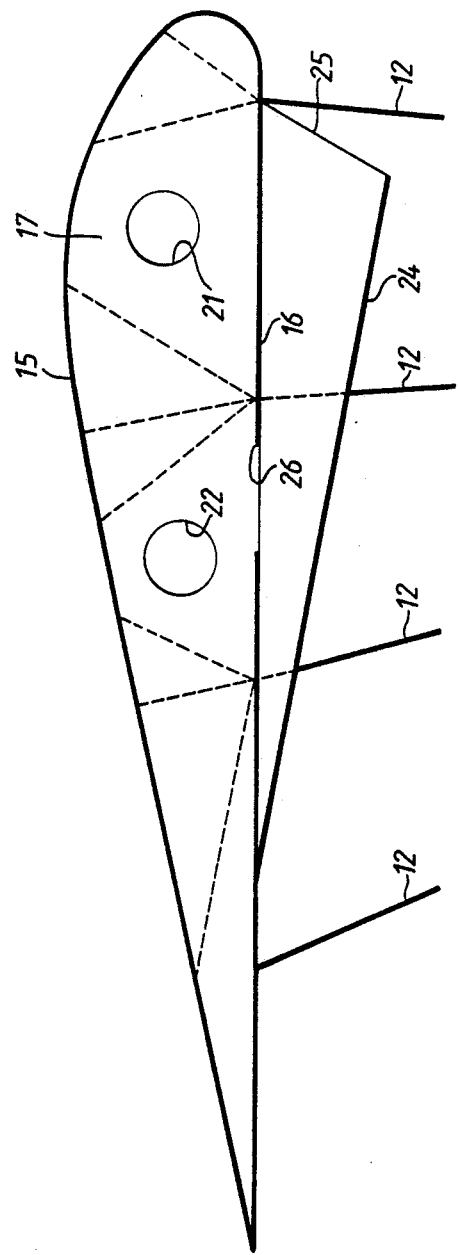
FIG. 4 is a schematic section of the canopy shown in FIG. 2 taken on the line IV—IV in FIG. 2.

As best seen in FIGS. 2, 3 and 4 the canopy 11 is formed by a fabric upper surface 15 and a fabric lower surface 16 connected by fabric ribs 17 which are of aerofoil shape as best seen in FIG. 4. The ribs 17 are arranged as shown in spaced relation across the canopy, extending in a direction parallel to the longitudinal axis A—A of the canopy in FIG. 2. The upper and lower surfaces 15 and 16 are joined together along their forward edges to form closed port and starboard leading edge portions 18 and 19 and also at their rear edges to form a single closed trailing edge 20. Each of the leading edge portions 18 and 19 extends outwardly and rearwardly away from the longitudinal axis A—A of the canopy 11 to form a swept back configuration. The ribs 17 extend from the closed leading edge portions 18 and 19 to the closed trailing edge 20 and form, together with the surfaces 15 and 16 side-by-cells 23. Each of the ribs 17 except the two outer ribs is formed with openings 21 and 22 which provide a communication between adjacent cells.

An air intake for the introduction of inflation air to the canopy 11 is provided by a fabric air scoop 24, which has a forward open end 25. Air entering the air scoop 24 passes into the canopy 11 through an opening 26 in the lower surface 16 of the canopy 11.

In use, the parachute illustrated in FIGS. 1 to 4 is deployed by the parachutist 14 and the canopy 11 spreads into an open configuration. In this open configuration it gradually inflates by the passage of air through the open end 25 of the air scoop 24, the air passing through the opening 26 in the surface 16 and then from cell to cell of the canopy through the openings 21 and 22 of the ribs 17, until finally the canopy takes up the aerofoil configuration illustrated in FIGS. 1 to 4. At this time, the parachute commences its descent flight path with the canopy longitudinal axis A—A aligned in the direction of motion of the canopy 11 and with the leading edge portions 18 and 19 to the fore and the trailing edge 20 to the rear and inflation of the canopy is maintained by the ram-air effect at the opening 25 of the air scoop 24.

In aerofoil parachutes hitherto proposed the canopy has been of rectangular shape in planform with a leading edge at right angles to the longitudinal axis A—A of the canopy, as indicated by the leading edge line 27 in FIG. 2. Air intakes are usually provided at the leading edge of the canopy and inflation of the canopy is effected and maintained by the ram-air effect at the intakes. It has however been found that while efficient inflation is obtained the efficiency of the canopy as an aerofoil is markedly reduced by the air intakes at the leading edge. Where an attempt is made to provide a closed leading edge, for example by placing an air intake on the underside of the canopy, it has furthermore been found that the leading edge collapses inwards and full inflation of the canopy is not achieved. Failure of the leading edge to inflate fully occurs because, whilst full external stagnation pressure is realised on the leading edge, the internal stagnation pressure of the canopy is somewhat less than this due to pressure loss through seams and due to fabric porosity.

In contrast, the leading edge of the canopy 11 illustrated in FIGS. 1 to 4 takes up a swept back configuration in which the leading edge portions 18 and 19 are inclined at an angle $\phi$ to the leading edge line 27. As a result, the internal stagnation pressure within the canopy 11 always exceeds the external static pressure on the leading edge portions 18 and 19 ensuring full inflation of the canopy and the maintenance of inflation of the leading edge portions in flight.

It can be shown that by sweeping back the leading edge of the canopy 11 as illustrated in FIG. 2, the maximum pressure on the leading edge is reduced to $$P_e = P_s + \tfrac{1}{2}\rho v^2 \cos^2\phi$$

where
 $P_s$ = free stream static pressure,
 v = total velocity,
 $\phi$ = sweep angle, and
 $\rho$ = density of air
whilst the pressure within the canopy is $$P_i = P_s + \tfrac{1}{2}\rho v^2 - \Delta p$$

where $\Delta p$ = pressure loss due to leakage.

Thus the canopy leading edge will remain inflated as long as $$\tfrac{1}{2}\rho v^2(1-\cos^2\phi) > \Delta p.$$

It will be appreciated that it is simply a matter of making an appropriate choice of the design parameters of the canopy 11 to achieve and maintain full inflation of the canopy 11 and in particular the leading edge portions 18 and 19 of the canopy 11 for flight at air speeds above a predetermined minimum velocity. Furthermore, as the leading edge portions 18 and 19 are closed off and inflation of the canopy achieved and maintained by air supplied through an air intake spaced from the leading edge, the aerofoil characteristics of the canopy 11 can be fully exploited. A sweep angle $\phi$ of 15° would, it is thought, be sufficient to achieve and maintain inflation of the leading edge of a canopy of the form illustrated in FIGS. 1 to 4.

The canopy 11 of the parachute shown in FIGS. 1 to 4 is formed with a straight trailing edge 20 and ribs 17 of variable chord length. It will however be appreciated that a canopy with a swept trailing edge and ribs of constant chord length could alternatively be used. A canopy of constant chord length would of course be simpler to manufacture. Furthermore, a canopy of tapering configuration, that is to say, with a straight trailing edge as described with reference to FIGS. 1 to 4 would ideally require some twist to obviate tip stall.

In the parachute described with reference to FIGS. 1 to 4, air intake 24 is located on the underside of the canopy 11. Although this is a preferred location for the air intake in an alternative embodiment of the invention (not illustrated) the air intake may be provided by leaving the two central cells 23 of the canopy 11 open. Nevertheless, the air scoop 24 on the underside of the canopy 11 is preferred as it is less likely to disrupt the upper surface air flow at the centre section of the canopy 11 where maximum lift is generated.

It will be appreciated that the air intake scoop 24 of the canopy 11 has only limited inlet area and that while it may be sufficient to maintain inflation of the canopy 11 during flight reasonably rapid inflation of the canopy 11 is necessary. In accordance with further embodiments of the invention hereinafter to be described with reference to FIGS. 5 to 7, 8 to 10 and 11 to 13 additional air intakes with closable openings are used in combination with the air scoop 24 for this purpose.

Figure 5:
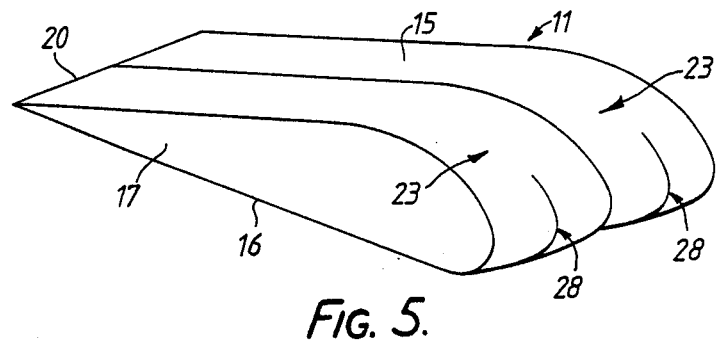
FIG. 5 is a schematic perspective view of part of a canopy of an aerofoil parachute according to the second embodiment of the invention.
Figure 6:
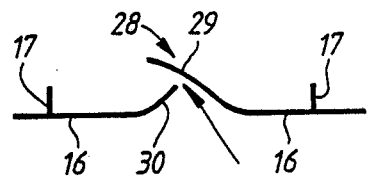
FIG. 6 is a scrap section of part of the leading edge of the canopy shown in FIG. 5, revealing a closable air intake in an open disposition.
Figure 7:
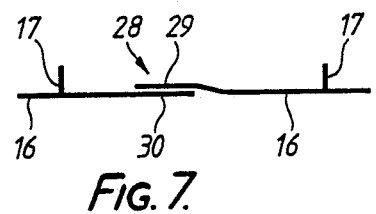
FIG. 7 is a schematic scrap section corresponding to that shown in FIG. 6 with the closable air intake in a closed disposition.

Referring now to FIGS. 5 to 7 the canopy 11 is formed with fabric upper and lower surfaces 15 and 16 joined together by ribs 17 spaced apart to form side-by-side cells 23. The leading edge of the canopy 11 is formed with a closable air intakes 28, each of which is arranged midway between two ribs 17 forming a cell 23 and lies in a plane parallel to the plane of a rib 17. As best seen in FIG. 6, the air intake 28 is formed by overlapping portions 29 and 30 of the fabric forming part of the leading edge of the canopy 11, which deflect as shown in FIG. 6 into an open disposition for inflation of the canopy 11 following its deployment and descent through the air. As inflation pressure builds up within the canopy 11 a condition is reached when the internal stagnation pressure at the swept back leading edge of the canopy 11 exceeds that of the external static pressure on the leading edge, causing the air intake 28 to take up a closed disposition as shown in FIG. 7. The canopy 11 otherwise follows the configuration of the canopy 11 illustrated in FIGS. 1 to 4.

Figure 8:
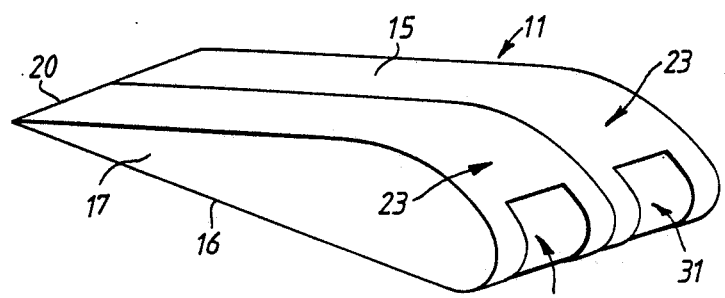
FIG. 8 is a schematic perspective view of a part of a canopy of an aerofoil parachute according to one form of a third embodiment of the invention.
Figure 9:
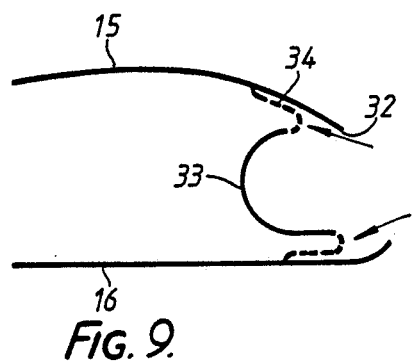
FIG. 9 is a scrap section of part of the leading edge of the canopy shown in FIG. 8, revealing a closable air intake in an open disposition.
Figure 10:
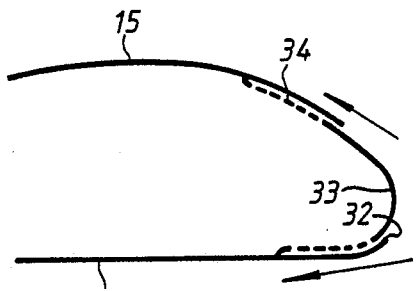
FIG. 10 is a scrap section corresponding to that shown in FIG. 9 with the closable air intake in a closed disposition.

Referring now to FIGS. 8 to 10, a modified canopy 11 is shown which includes closable air intakes 31 along the leading edge of the canopy 11, with one air intake 31 being provided for each cell 23 of the canopy. As best seen in FIG. 9, the air intake 31 is formed by a rectangular opening 32 provided in the leading edge fabric of the canopy 11 and a rectangular fabric closure sheet 33 secured along its periphery to the fabric of the canopy 11 by a peripherally extending support strip 34 of an open mesh material. Following deployment of the canopy 11 and during its subsequent descent through the air the fabric sheet 33 collapses inwardly and takes up a disposition as shown in FIG. 9 in which air is supplied for inflation of the canopy through the open mesh peripheral support strip 34. As inflation pressure builds up within the canopy 11 a condition is reached when the internal stagnation pressure at the swept back leading edge of the canopy 11 exceeds that of the external static pressure on the leading edge, causing the closure sheet 33 to deflect outwardly and take up the disposition shown in FIG. 10 in which it marginally overlaps the opening 32 in the leading edge of the canopy and holds the open mesh support strip 34 against the interior of the canopy 11, thereby sealing off the air intake and producing a leading edge surface of aerofoil configuration. The canopy 11 of the arrangement shown in FIGS. 8 to 10 otherwise follows the configuration of the canopy 11 illustrated in FIGS. 1 to 4.

The air intakes 28 in the modified canopy 11 of FIGS. 5 to 7 as well as the air intakes 31 of the modified canopy 11 shown in FIGS. 8 to 10 are provided in addition to the air scoop 24 and are used for initial inflation of the canopy only, with the air scoop 24 serving to maintain inflation during subsequent flight of the parachute.

Figure 11:
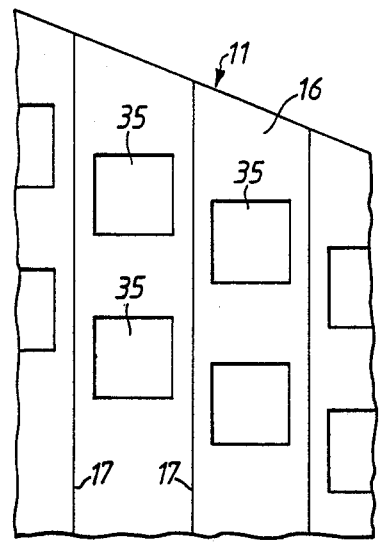
FIG. 11 is a plan view from below of part of a canopy of an aerofoil parachute according to another form of the third embodiment of the invention.
Figure 12:
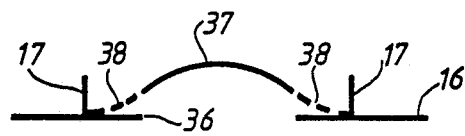
FIG. 12 is a scrap section of part of the canopy shown in FIG. 11, revealing a closable air intake in an open disposition.
Figure 13:
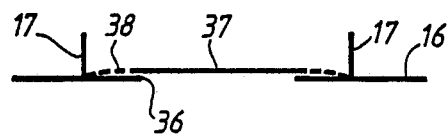
FIG. 13 is a scrap section corresponding to that shown in FIG. 12, with the closable air intake in a closed disposition.

In yet another embodiment of the invention shown in FIGS. 11 to 13 supplementary air intakes 35 of the same form as the air intakes 31 in the arrangement shown in FIGS. 8 to 10 are provided in the lower surface 16 of the canopy 11. As best seen in FIG. 9, the air intake 35 is formed by a rectangular opening 36 provided in the surface 16 and a rectangular fabric closure sheet 37 secured along its periphery to the surface fabric by a peripherally extending support strip 38 of an open mesh material. Following deployment of the canopy 11 and its descent through the air the fabric sheet 37 collapses inwardly and takes up the disposition shown in FIG. 12 in which air is rapidly supplied for inflation of the canopy 11 through the open mesh support strip 38. As inflation pressure builds up within the canopy 11 a condition is reached when the internal stagnation pressure causes the sheet 37 to deflect in an outward direction and take up the disposition shown in FIG. 13 in which it marginally overlaps the opening 36 and holds the open mesh strip 38 against the inside of the surface 16, thereby sealing off the air intake 35 and producing a substantially uninterrupted lower surface 16.

It will be appreciated that the parachute hereinbefore described with reference to the drawings has been shown only diagrammatically and that several modifications well known in the art may be incorporated to render it more efficient and reliable in use. For example, a large number of suspension lines 12 are needed in order to maintain the chordwise profile of the lower surface of the canopy 11 and it would be considered appropriate to provide bifurcated lines to reduce drag. Furthermore, stabilising fabric end panels may be used to provide "end-plating" and to enhance directional stability. Any one of a number of aerofoil sections may be used but the most commonly employed is the clark Y section with a section depth of typically 18% chord.

Lateral-directional and longitudinal control would normally be provided by steering lines attached to the trailing edge of the canopy 11 at each outer end thereof. These would normally form a crow's foot pattern. Pulling down on one control line or the other causes the trailing edge on one side of the canopy or the other to deflect, turn control being effected by an asymmetric pull on the control lines and the angle of incidence control and flare out being accomplished by an even pull on them.

In the aerofoil parachute hereinbefore described with reference to the drawings, the canopy 11 would normally deploy in a manner similar to that of a conventional parachute until it reaches normal flying size with little cell inflation taking place. Subsequently, it starts to collapse and pitches forward and as the pitching motion occurs the cells of the canopy gradually inflate and the canopy then begins to fly. Because of the inherent rapid deployment of such parachutes, a reefing device is invariably employed. For example, it is common practice to employ slider reefing in which a square fabric slider is arranged to constrain the suspension lines to control the rate of deployment of the canopy. At deployment the slider is positioned at the top of the lines adjacent the canopy, effectively reefing the parachute. During inflation the tension in the lines forces the slider down permitting a controlled deployment of the canopy. It may be found desirable also to arrange for the parachute to be initially rigged nose down by introducing a releasable loop in the forward risers. This would ensure that a maximum air intake area is presented to the air flow. After inflation of the canopy is completed, the loops in the risers could be released and the canopy would then take up its normal flying attitude.

In the parachute hereinbefore described with reference to the drawings, the suspension lines 12 are advantageously arranged to be of such lengths as to produce arc-anhedral of the canopy 11 and the improved stability associated with this configuration.

While the invention finds particular application to aerofoil parachutes in which a canopy is used to control the descent of a parachutist who can make use of the aerodynamic properties of the canopy to produce extended glide paths utilising the lift produced by the canopy, it can also be used in aerofoil parachutes for the controlled descent of other loads, such as stores and equipment. It will furthermore be appreciated that the invention may be applied to other aerial devices which utilise an inflatable component of aerofoil configuration. For example, the inflatable canopy of the parachute hereinbefore described may serve as an inflatable wing used for powered flight where the wing produces lift for controlled ascent as well as for controlled descent of the device.

We claim:

1. A load carrying aerial device comprising:
   an inflatable component which is inflatable from a collapsed configuration to an inflated aerofoil configuration, said inflatable component including a first wing tip, a second wing tip, an upper surface and a lower surface;
   an air intake located on the lower surface of the component and remaining open during inflation of the component and during descent for the maintenance of inflation of the component during flight as a result of relative motion of the component and the surrounding air;
   a scoop mounted on the lower surface of said inflatable component for directing air into said air intake; and
   a leading edge extending continuously from said first wing tip to said second wing and from said upper surface to said lower surface;
   said leading edge of the component throughout substantially its length being closed or maintained closed in flight, the leading edge extending away from the longitudinal axis of the component on each side thereof outwardly to said first and second wing tips and rearwardly to provide in plan form a swept back configuration symmetrical with respect to the longitudinal axis of the component, the internal stagnation pressure of the air within the component at said leading edge produced by the relative motion of the component and the air always exceeding the external static pressure of the air on the leading edge, thereby ensuring maintenance of the profile of the leading edge in flight by air from said air intake.

2. A device according to claim 1, wherein the air intake is arranged symmetrically with respect to the longitudinal axis of the component.

3. A device according to claim 1, wherein the inflatable component is formed by fabric upper and lower surfaces joined together by a plurality of fabric ribs which are spaced apart to form with the surfaces side-by-side cells extending rearwardly from the leading edge of the component.

4. A device according to claim 3, wherein the ribs are so constructed as to allow communication of inflation air between adjacent cells.

5. A device according to claim 1 wherein the inflatable component is formed by fabric upper and lower surfaces joined together by a plurality of fabric ribs which are spaced apart to form with the surfaces side-by-side cells extending rearwardly from the leading edge of the component and wherein the air intake means further comprises a plurality of air intakes which have closable openings in the surface material of the component and which open for inflation of the component and automatically close when the internal pressure of the air within the component exceeds the external pressure of the air at the opening.

6. A device according to claim 5, wherein each of the closable openings is formed by opposing overlapping portions of surface material which move apart to form a slit opening to permit the passage of inflation air when the external pressure exceeds the internal pressure and which are caused to move together to seal the opening when the internal pressure exceeds the external pressure.

7. A device according to claim 6, wherein the slit opening extends in a plane parallel to the ribs.

8. A device according to claim 5, wherein each of the closable openings is formed by a first portion of surface material overlapping an aperture in a second portion of surface material, the first portion of surface material being secured to the second portion of surface material by an air previous material, and the arrangement being such that when the external pressure exceeds the internal pressure the first portion of surface material moves away from the second portion of surface material to permit the passage of inflation air into the component through the air pervious material and closes upon the second portion of surface material to close the aperture therein when the internal pressure exceeds the external pressure.

9. A device according to claim 8, wherein the aperture in the second portion of surface material is of rectangular shape and the first portion is of corresponding shape and wherein the air pervious material extends round the peripheries of the aperture and the first portion.

10. A device according to claim 8, wherein the closable openings are located on the underside of the component.

11. A device according to claim 1 for use in controlling the aerial descent of a load, the device including a load support harness and suspension lines connecting the inflatable component to the support harness.

* * * * *